United States Patent [19]

Manger, Nina

[11] 4,427,390
[45] Jan. 24, 1984

[54] EDUCATIONAL BOOK-LIKE TOY

[76] Inventor: Manger, Nina, 7855 Boulevard East Apt. 10-D, North Bergen, N.J. 07047

[21] Appl. No.: 315,190

[22] Filed: Oct. 26, 1981

[51] Int. Cl.³ .............................................. G09B 1/06
[52] U.S. Cl. ................................... 434/159; 434/170; 434/172; 273/DIG. 30
[58] Field of Search .............. 434/159, 167, 168, 170, 434/172, 327, 330; 273/DIG. 30

[56] References Cited

U.S. PATENT DOCUMENTS

| 364,845 | 6/1887 | Oakley | 434/167 |
|---|---|---|---|
| 2,848,823 | 8/1958 | Washburn | 434/170 |
| 3,010,228 | 11/1961 | Torre | 434/168 |
| 3,316,669 | 5/1967 | Nachbar | 273/DIG. 30 X |
| 3,491,196 | 1/1970 | Stein | 434/167 X |

Primary Examiner—William H. Grieb

[57] ABSTRACT

An instructional toy (10) adapted to instruct young children by association. Colored three-dimensional overlays (30) correspond to printed matter (36) on rigid pages (12-22). The rigid page is of a slightly different shade of the color of the overlay for visual distinction between them when the overlay is properly positioned. Means (32 and 34) for supporting overlays in singular positions over the printed matter (36) are provided in such a manner that each overlay lockingly engages with only one corresponding printed matter (36) on one page. Multiple pages (12, 14, 16, 18, 20, 22) are printed of various colors such that the page between pages of primary color indicate the color resulting from a mixture of those primary colors. While the invention is useful in teaching the young pupil, it can also be of value in the teaching of slow learners and adults with learning difficulties.

3 Claims, 8 Drawing Figures

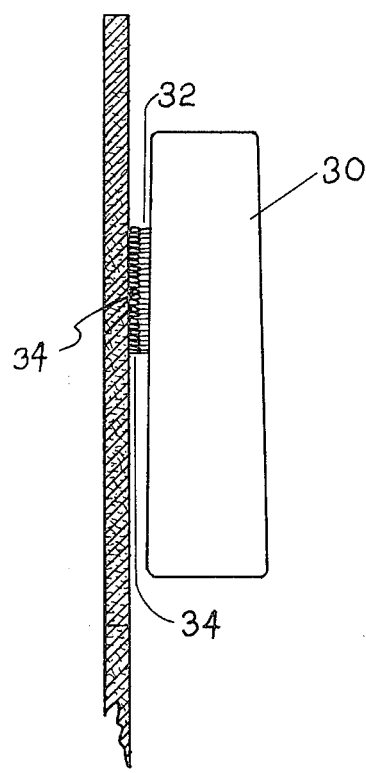
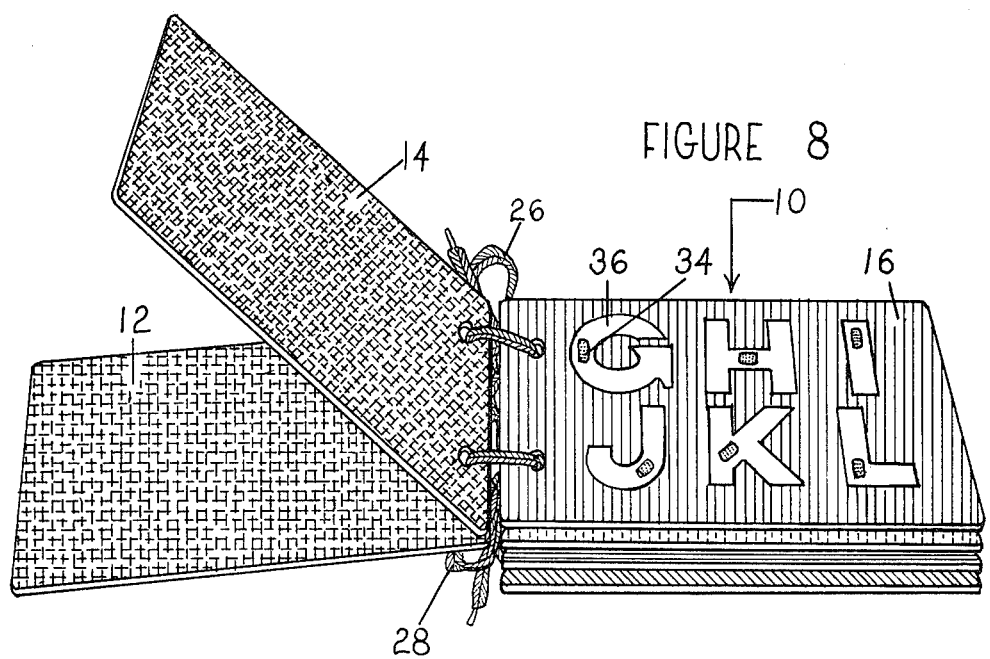

EDUCATIONAL BOOK-LIKE TOY

TECHNICAL FIELD

The invention relates to an instructional book-like toy of the type which is useful for teaching young children to read and/or learn by encouraging them to memorize the shape of a letter-shaped object and a printed representation of the letter, and associate the two.

BACKGROUND ART

Young children are normally taught to read by associating the names with the shapes of the letters of the alphabet. Likewise, children may be shown words and taught to associate them with pictures of the items which the words represent. One class of educational toys teach the letters of the alphabet by encouraging the children to physically associate an object shaped like a given letter with a printed representation of the letter. Thus a book-like device will include a plurality of pages each with a number of recesses shaped to matingly receive the letter-shaped objects. Thus the child is encouraged to memorize the shape of the letter and associate the letter-shaped object with the letter-shaped recess in the book.

While such devices are useful, they do present a number of limitations. For example, the recess in the book, while it is similar to the printed word, is not a printed representation. Naturally, the pages of the book themselves present the disadvantage of being relatively expensive to manufacture. In use, the letter-shaped objects are retained in the pages of the book by gravity or friction. When friction is used to retain the letters, the limited area of the letter-shaped object available to the child makes grasping difficult. Similarly, in the event that only gravity is used to retain the letters, movement of the book with the letters in it by the child is likely to result in the letter's falling from the book.

As a solution to these inconveniences, it has been suggested that a separate device be used for storing the letters, which device may either be integral with or separate from the book. Likewise, books have been designed in which natural static electricity is used to adhere the objects to the page. However this method is suitable only for very thin flexible overlays. Such thin objects are difficult for children to grasp and function poorly as teaching devices because their shape is often not retained, due either to inherent flexibility or breakage and wear.

DISCLOSURE OF THE INVENTION

The invention as claimed is intended to provide an educational toy for teaching the letters of the alphabet or other knowledge (e.g. flora, fauna, etc.) by associative means which eliminates the above-described deficiencies of the prior art. It is relatively inexpensive to manufacture, is easy to use and store and exhibits durability. In addition it has a number of other features which make it a more effective teaching device.

In accordance with the invention using the alphabet as an example, the educational book-like toy includes a plurality of large, three-dimensional overlay objects shaped in the form of letters and a book having a plurality of pages and the letters of the alphabet printed thereon. The large overlay objects capture the interest of the young pupil by appearing to be toys in size and feel. Means are provided for fastening the overlay objects to the rigid pages of the book-like toy. The fastening means are secured to the underside of the letter-shaped objects and occupy a relatively small portion of each object. When the object is placed directly over the printed representation of the letter whose shape the object represents, a securing means on the letter directly overlies a mating securing means on the printed page, thus allowing the letter to be attached to the page. Inasmuch as a given page may include only six letters, the securing means on the letter-shaped object and the page are positioned at different points for each letter, whereby the object may be secured only over the letter whose shape it represents. Likewise, to prevent confusion, all of the letters on the given page may be the same color as the page, perhaps with some difference in shade or intensity in order to define the object with respect to the page or may be white throughout the book.

In a preferred embodiment, an educational toy which comprises a plurality of colored pages is provided. Three pages are colored with the primary colors yellow, red, and blue. Pages between any two of these pages are colored with a color which results from the mixture of the two primary colors on the adjacent pages. The back page is green, the mixture of yellow and blue. This may be enlarged for added pages if and when needed, for example, by the addition of pages which are colored yellow orange, red orange etc.

BRIEF DESCRIPTION OF THE DRAWINGS

One way of carrying out the invention is described in detail below with reference to the drawings which illustrate only one specific embodiment, in which:

FIG. 7 is a side view partially in cross section along lines 7—7 of FIG. 6; and

FIG. 8 is a perspective view illustrating the teaching of colors in accordance with the present invention.

BEST MODE FOR CARRYING OUT THE INVENTION

Figure 1:
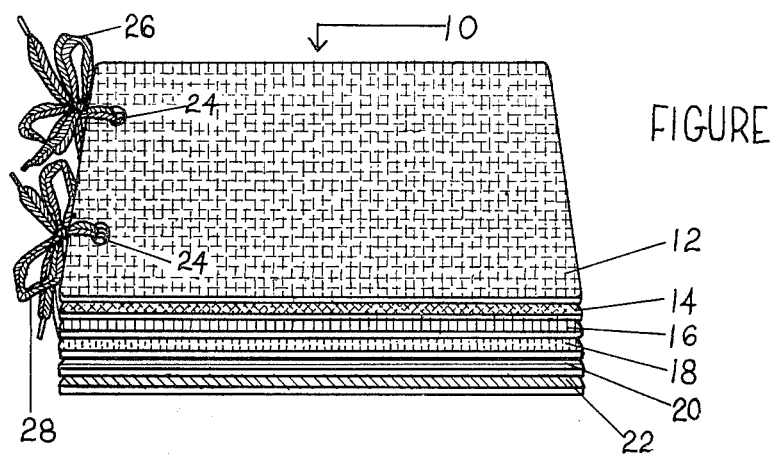
FIG. 1 is a perspective view of a book-like toy constructed in accordance with the present invention.
Figure 2:
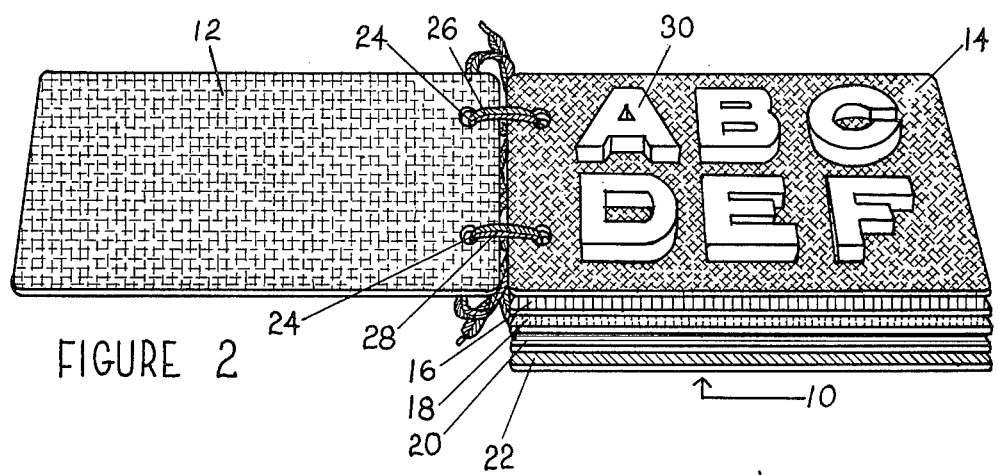
FIG. 2 is a perspective view of the inventive toy with the cover page opened.

Referring to FIG. 1, a book 10 constructed in accordance with the present invention includes a plurality of pages 12, 14, 16, 18, 20 and 22. Pages 12–22 are colored yellow, orange, red, violet, blue and green, respectively. The pages have holes 24 which accommodate binders 26 and 28. The letters of the alphabet are represented by a plurality of letter-shaped overlays 30. The overlays 30 are a slightly different shade of the color of the page they overlay. Such coloring facilitates the identification of the overlays with the page associated with each of the overlays and, at the same time allows contrast differentiation between the background of the page and the overlay, when the overlay is secured to the page, as illustrated in FIG. 2.

Figure 3:
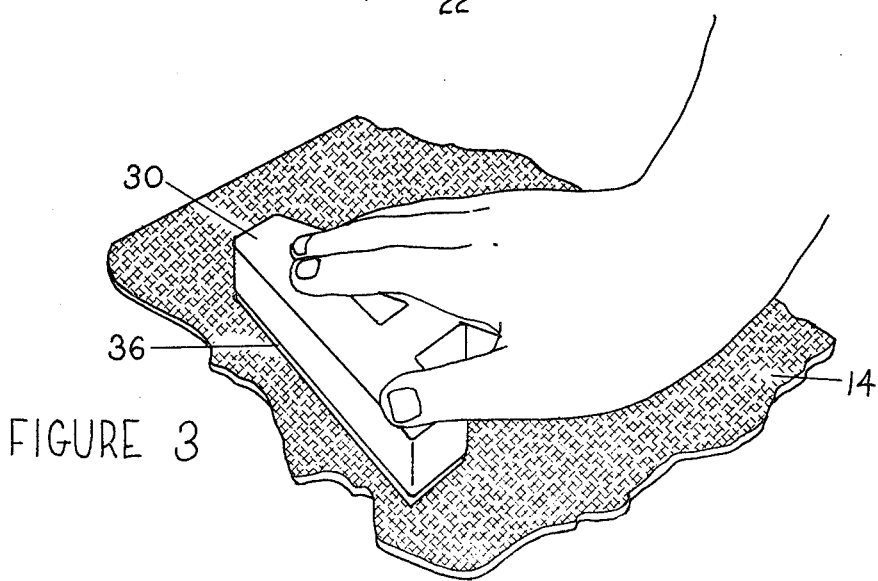
FIG. 3 is a perspective view showing the placement of an object representing a letter on a page in the inventive book by a child's hand.
Figure 4:
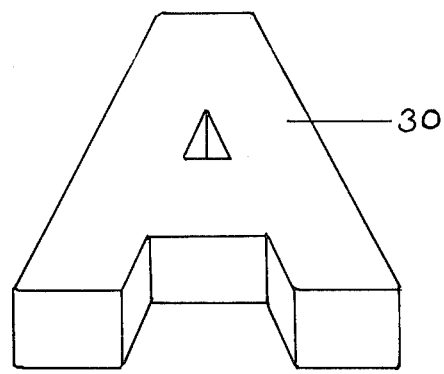
FIG. 4 is a perspective view of one of the objects representing letters provided in accordance with the present invention.
Figure 5:
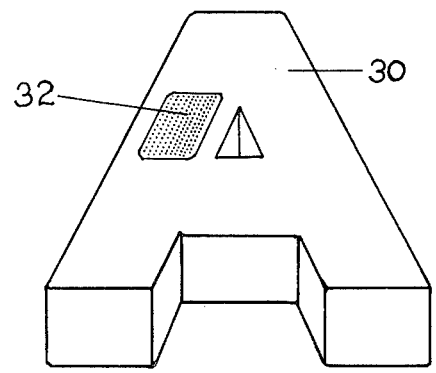
FIG. 5 is a view of the underside of the object illustrated in FIG. 4.
Figure 6:
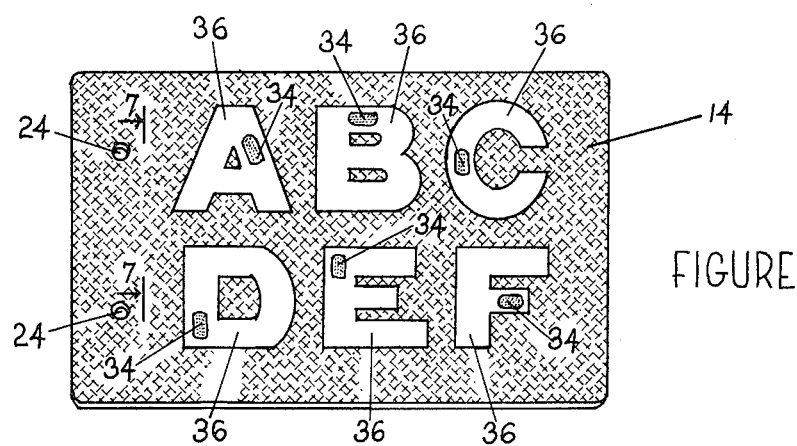
FIG. 6 is a plan view of a page of the inventive book-like toy.

As illustrated in FIG. 3, overlays 30 (FIG. 4) are three-dimensional and thus are likely to maintain a pupil's attention by giving the impression of being a toy. Preferably the overlays are substantially as thick as a child's finger. As illustrated in FIG. 5, the underside of each overlay 30 has a Velcro strip 32 attached to it. The position of the Velcro strip 32 on each letter is such that that letter cannot overlie a letter printed on one of the pages 14–22 and be attached to the page unless the overlying letter represented by the overlay is placed over the proper letter. For example, if the overlay shaped like the letter "A" illustrated in FIG. 5 is placed over the printed representation 36 of the letter A on page 14 (FIG. 6) it will adhere to the letter A. However, if the overlay 30 illustrated in FIG. 4 is placed over any of the letters B, C, D, E or F, the position of the velcro strip 32 is such that it will not make contact with the velcro strip 34 secured to letters other than the letter A on page 14. Thus, the positions of velcro strips 34 on printed letters 36 and the three-dimensional overlays 30 are such that each of the overlays 30 will fasten only to the letter which it represents and will not be interchangeable with any other letter on the same page. FIG. 7 illustrates the engagement of one of the overlays 32 on page 14.

It is noted that this structure, most clearly illustrated in FIG. 7, does not provide for shaped recesses, in accordance with the present invention. This provides the additional advantage of not allowing the child to rely upon trial fitting and thus he must learn the visual task to be performed.

As shown most clearly in FIG. 8, the toy 10 may also serve the additional function of instructing the pupil in color relationships. In particular, page 14, which is orange, is positioned between pages 12 and 16 which are yellow and red, respectively. Thus the pupil may open the book with the assistance of the teacher and view the color orange on page 14 which is the mixture of the colors on the two adjacent pages 12 and 16. It is noted that each of the pages 12–22 have the same color on both their obverse and reverse faces. Likewise, violet page 18 is positioned between red page 16 and blue page 20 inasmuch as violet represents the combination of red and blue. Finally, green page 22, by appropriate rotation of the book may be positioned between yellow cover page 12 and blue page 20 illustrating that green results from the mixture of yellow and blue. The teacher may use the book to teach colors in a different fashion, for example by untying binders 26 and 28 so that the pages may be used as individual teaching aids.

In is contemplated that the educational toy of the present invention may be used either by the pupil alone or under the supervision of a teacher. For example, the pupil may be given the problem of finding a particular letter in the book. He would be handed the overlay whose shape illustrates the letter to be sought and the complete book 10. The color of the overlay 30 selected may be used by the student to associate it with one of the pages of the book. Once the correct page has been found by the pupil, he must then proceed to make an association strictly on the basis of shape. Such association is made by mentally memorizing the shape of the object which he holds, perhaps to some extent by physically exploring its structure with his hands. The pupil then attempts to make the correct selection of the printed letter 36 on the page and places the overlay 30 over the printed letter. If the wrong association has been made, the overlay will either not lie generally over the printed letter or will not adhere to the printed letter, thus telling the pupil whether he has made the right association or whether he should attempt again to make the proper association.

While an embodiment of the invention has been illustrated, it is, of course, understood that various modifications will be obvious to those of ordinary skill in the art. Such modifications are within the scope of the invention which is limited and defined only by the appended claims.

I claim:
1. An instructional toy comprising:
   (a) differently colored rigid pages with items of printed matter printed thereon;
   (b) individual objects which are relatively thick in comparison to said rigid pages, substantially as thick as a child's finger; and colored a distinguishable shade of the color of the rigid page to which they correspond;
   (c) fastening elements disposed on said rigid pages; and
   (d) mating fastening elements disposed on the undersides of said individual objects, wherein the shape of the underside of each of said individual objects corresponds identically to the shape of only one of said items of printed matter; each of said individual objects has one of said mating fastening elements disposed on its underside and covering only a portion of said underside; each of said items of printed matter has one of said fastening elements disposed on the area defined by said printed matter and covering only a portion of said area; and each of said fastening elements is positioned to confront its corresponding mating fastening element only when each of said items of printed matter confronts the underside of its matching individual object, wherein said rigid pages are each uniquely colored, the order of said colored pages being yellow, orange, red, violet, blue and green to teach color theory surreptitiously while another learning process is taking place, the later learning process occurs when the individual "feels" the objects while placing them in their proper places on the differently colored rigid pages.

2. An educational toy according to claim 1, wherein said individual objects are alphabetic, numerical or depicting flora and fauna or the like and function as shaped block-like toys when not fastened to said rigid pages, and said individual alphabetic objects do not function as an educational aid in the spelling of words when fastened to said rigid pages.

3. An instructional toy according to claim 1, wherein said fastening means and said mating fastening means comprise pieces of VELCRO fastening elements correspondingly positioned on said rigid pages.

* * * * *